(12) United States Patent
Sinn

(10) Patent No.: US 12,060,136 B2
(45) Date of Patent: Aug. 13, 2024

(54) FRAMEWORK AND OFFSHORE SUPPORT STRUCTURES MADE THEREOF

(71) Applicant: Sinn Power GmbH, Gauting (DE)

(72) Inventor: Philipp Sinn, Gauting (DE)

(73) Assignee: Sinn Power GmbH, Gauting (DE)

( * ) Notice: Subject to any disclaimer, the term of this patent is extended or adjusted under 35 U.S.C. 154(b) by 394 days.

(21) Appl. No.: 17/441,031

(22) PCT Filed: Mar. 23, 2020

(86) PCT No.: PCT/EP2020/058041
§ 371 (c)(1),
(2) Date: Sep. 20, 2021

(87) PCT Pub. No.: WO2020/188124
PCT Pub. Date: Sep. 24, 2020

(65) Prior Publication Data
US 2022/0212755 A1  Jul. 7, 2022

(30) Foreign Application Priority Data
Mar. 21, 2019 (DE) .......................... 102019203881.6

(51) Int. Cl.
*B63B 1/14* (2006.01)
*B63B 1/12* (2006.01)
(Continued)

(52) U.S. Cl.
CPC ............... *B63B 1/14* (2013.01); *B63B 1/125* (2013.01); *B63B 35/38* (2013.01);
(Continued)

(58) Field of Classification Search
CPC ............................... B63B 1/041; B63B 1/125; B63B 1/14; B63B 2001/126; B63B 1/107;
(Continued)

(56) References Cited

U.S. PATENT DOCUMENTS 3,970,024 A  7/1976  Fisher
5,906,172 A  5/1999  Kordes
(Continued)

FOREIGN PATENT DOCUMENTS

DE  3630411 A1  9/1987
FR  2659058 A1  9/1991
(Continued)

OTHER PUBLICATIONS

Japan Office Action for Japan Application No. 2021555852, mailed Oct. 17, 2022; 8 pages.

*Primary Examiner* — Daniel V Venne

(57) ABSTRACT

Floatable, torus-segment-like pontoon for a torus-like floating body constructed from a plurality of such pontoons, with a torus eye containing the torus axis of rotation. The pontoon comprises connecting means on substantially flat side surfaces, which are designed in such a way that adjacent pontoons can be joined in a positive-fitting manner in the axial direction; Receiving areas on the radially inner pontoon surfaces for receiving a component in the torus eye; Retaining means arranged on the radially outer pontoon surfaces for holding adjacent pontoons together in the torus circumferential direction and in the radial direction; and connecting means configured on one of the side surfaces as at least one groove extending in the radial direction and on the other side surface as at least one opposite, substantially complementary tongue opposite to the groove. Said pontoon made of plastic and produced by rotational melting, extrusion blow moulding or RIM process.

12 Claims, 10 Drawing Sheets

Figure 1:
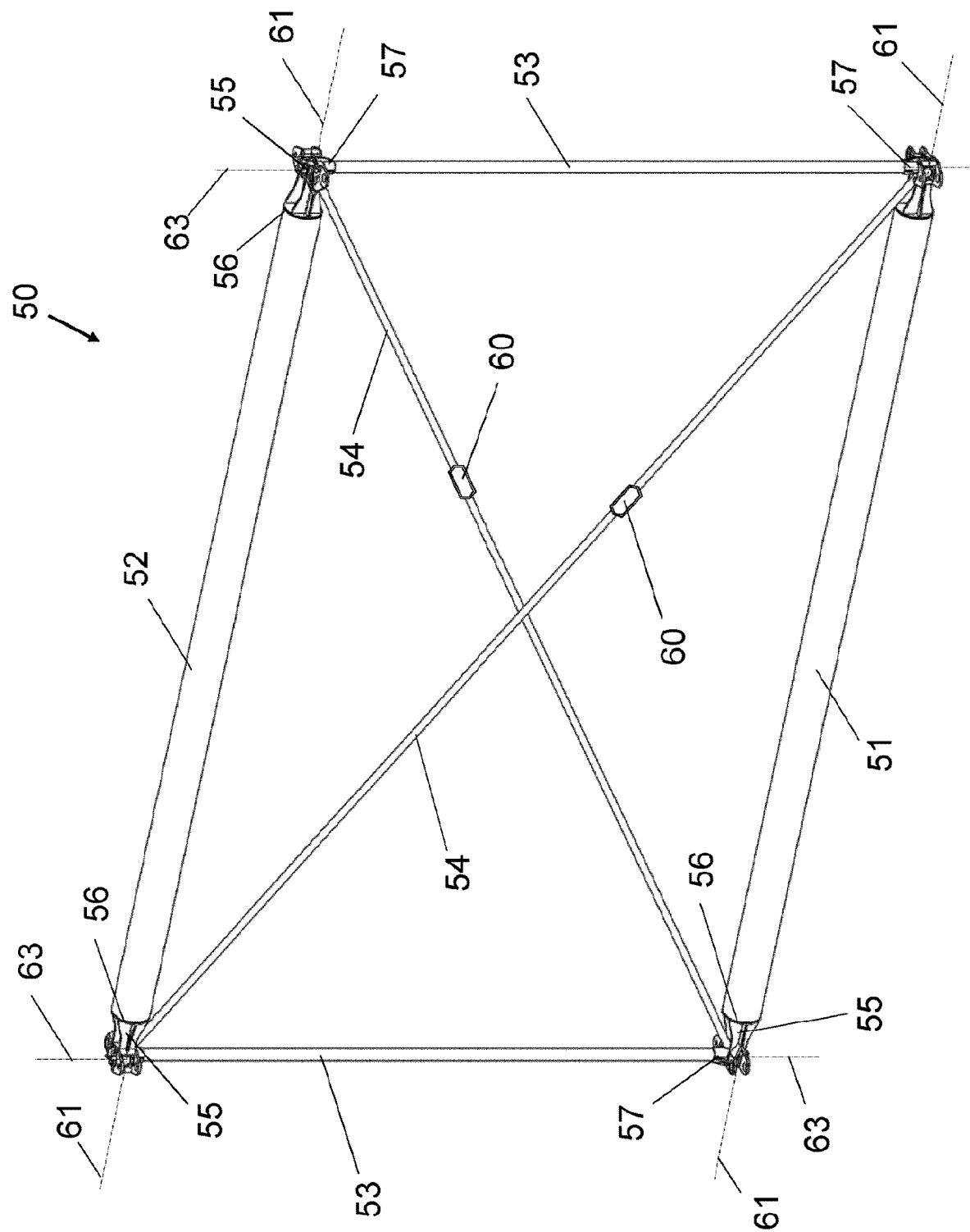

(51) Int. Cl.
*B63B 35/38* (2006.01)
*B63B 35/44* (2006.01)

(52) U.S. Cl.
CPC ......... *B63B 2001/126* (2013.01); *B63B 35/44* (2013.01); *B63B 2035/4466* (2013.01)

(58) Field of Classification Search
CPC . B63B 35/38; B63B 35/44; B63B 2035/4466; B63B 3/04; B63B 5/24; B63B 75/00; Y02E 10/30; Y02E 10/727
USPC .................................................. 114/114, 61.2
See application file for complete search history.

(56) References Cited

U.S. PATENT DOCUMENTS

| | | | | |
|---|---|---|---|---|
| 7,786,609 | B2 * | 8/2010 | Houser | ............... F03B 13/1845 290/53 |
| 8,482,145 | B2 * | 7/2013 | Houser | ............... F03B 13/1845 290/53 |
| 2016/0152307 | A1 | 6/2016 | Zhang | |
| 2017/0184071 | A1 | 6/2017 | Androsiuk | |

FOREIGN PATENT DOCUMENTS

| | | |
|---|---|---|
| JP | 11988082699 U | 5/1988 |
| JP | 1994211185 A | 8/1994 |
| KR | 20120045738 A | 5/2012 |
| KR | 101428543 B1 | 8/2014 |
| NO | 20160999 A1 | 11/2017 |
| WO | 8703170 A1 | 6/1987 |
| WO | 8800904 A1 | 2/1988 |
| WO | 2011124728 A1 | 10/2011 |
| WO | 2012098564 A1 | 7/2012 |
| WO | 2014027960 A1 | 2/2014 |
| WO | 2016170201 A1 | 10/2016 |
| WO | 2018143818 A1 | 8/2018 |

* cited by examiner

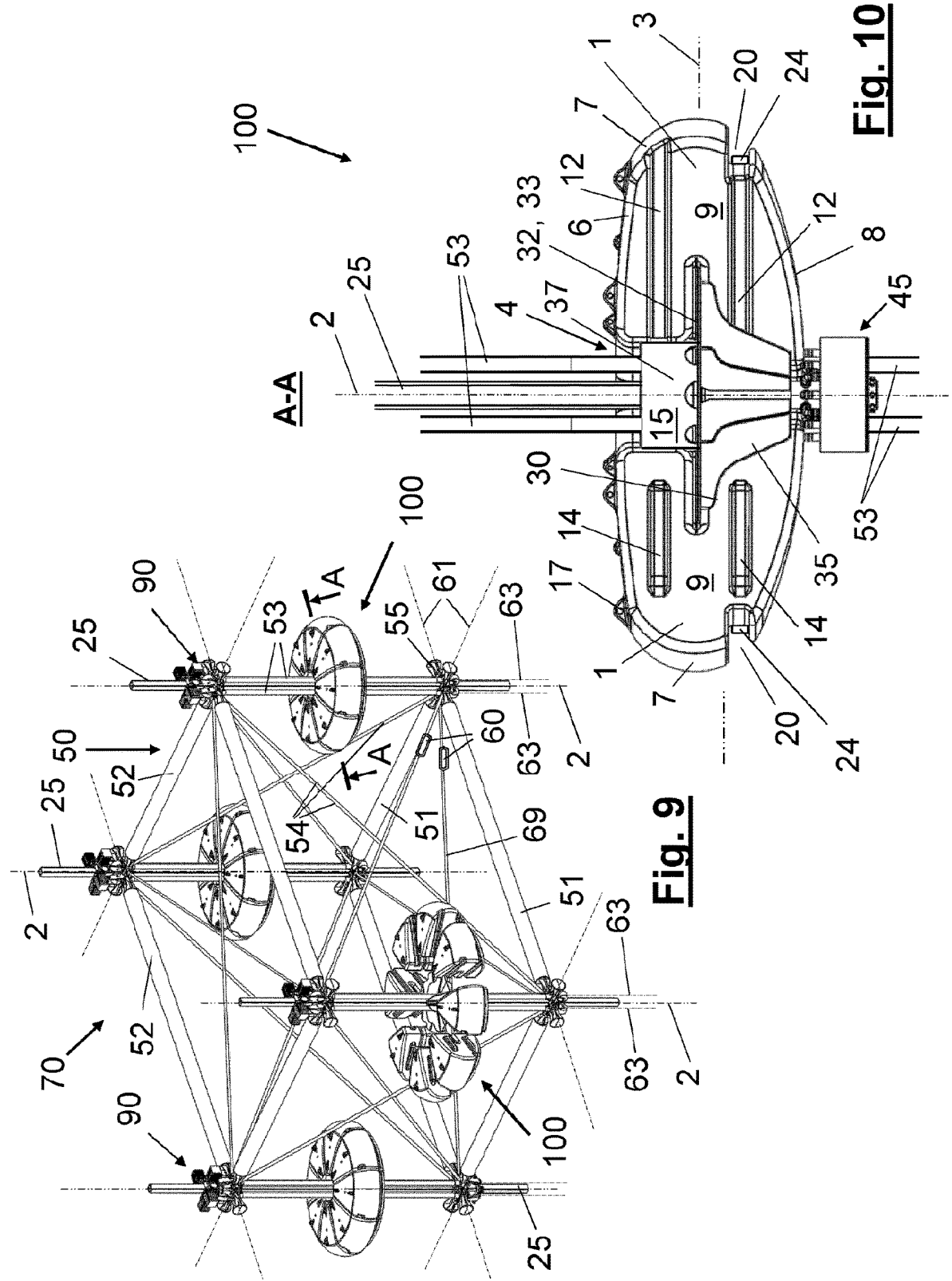

FRAMEWORK AND OFFSHORE SUPPORT STRUCTURES MADE THEREOF

The invention concerns buoyant frameworks constructed in a substantially planar manner and buoyant 3-dimensional support structures assembled in a modular manner therefrom, for example as a support structure for floating platforms, for example for the mounting of solar panels and wind energy plants, or as a support structure for wave power plants.

Floating platforms such as platforms supported by floating bodies or pontoons and the like are known in the state of the art in various forms. Many of these structures are complex in their construction and are therefore often assembled on land, to be transported to their place of use in an assembled state. In particular, this limits the size of such platforms.

Support structures with a larger surface area that are assembled offshore are often difficult to manipulate or manoeuvre, especially if they are to be used in the open sea, i.e. in the ocean. In this context, offshore construction in particular requires significant use of auxiliary resources, thereby incurring costs, which can be very high for such extensively planar support structures.

It is therefore the object of the invention to provide a support structure which can be constructed with simple means and inexpensively, whereby the support structure is to be modular in construction and extendable. The manufacturing and assembly effort is to be reduced to a minimum, in particular the effort required for offshore assembly. With the load-bearing structure according to the invention, it is furthermore to be possible to provide a robust, buoyant support structure which is flexibly adaptable in terms of its dimensions and load-bearing capacity.

The object is achieved by a buoyant framework configured in a substantially planar manner according to claim 1. Advantageous embodiments are indicated in the dependent claims 2-7. The object according to the invention is further achieved by a buoyant framework structure according to claim 8 or 9. Preferred embodiments of these framework structures are indicated in the dependent claims. In order to increase buoyancy, floating bodies according to independent claim 14 are further given, whereby preferred further refinements are indicated in the sub claims dependent thereof. Claim 21 further discloses a wave power plant which is constructed in a modular manner from a plurality of framework structures according to the invention, which in turn are constructed in a modular manner from the framework structures according to the invention. The above-mentioned floating bodies are used to convert wave energy into electrical energy.

The base unit according to the invention forms a framework which is intended for the modular construction of an offshore framework structure and is substantially planar in configuration.

The framework according to the invention exhibits a first bar which functions as a floating body and a second bar, both of which are supported parallel to each other by means of two lateral posts. The framework can be held in shape or diagonally tensioned by means of two braces. Connection elements with flanges are positioned at the ends of the bars to join the bars to the posts and the braces. If the first and/or the second bar is made of a hollow body, the flanges close the bars in a fluid-tight manner so that a volume of air enclosed in them generates a corresponding buoyancy force. If metallic materials are used, this can be done by welding the flanges to the bars, for example. Other standard connections such as screwing or gluing, possibly with seals, are also within the scope of the inventive concept. In a further embodiment, at least the first bar is designed as a fluid-tight hollow body, to the ends of which the connection elements can be attached to.

Preferably, the bars together with the connection elements fastened to their ends form a module of the framework according to the invention, which, in particular, is pre-assembled on land. In this case, the connection elements have receiving areas next to the flanges for attaching the posts to the bars transversely to the longitudinal direction of the bars in order to keep the bars spaced in a parallel manner. Preferably, these lateral posts, which are aligned in substantially perpendicular fashion with the bars, are simply plugged together with the receiving areas. Further preferably, this is done without the use of tools, so that all known types of rigid or articulated plug-in, clamp and clip connections are covered by the inventive concept which are suitable for attaching the posts to the connection elements without tools. In order to keep the framework of the invention in shape, to tension it and to hold it together as necessary, and therefore also to keep the bars attached to the posts, braces are used which exhibit tensioning devices. These braces can be attached to securing means on the connection elements and fix the framework diagonally, or hold it in its substantially rectangular shape. The term braces includes tension and lashing braces, as well as struts with a tensioning device, for example with the relevant left/right-hand threads, ropes, etc.

In a preferred embodiment, pins are inserted into the connection elements transversely to the longitudinal direction of the bars and transversely to the longitudinal direction of the posts, whereby the pins are further preferably rotatable but are mounted in the connection elements in an axially fixed manner by the braces inserted therein. In one embodiment of the invention, the framework struts, which are configured as braces, can be divided at the tensioning device and have a collar at the end opposite the tensioning device in each case, the diameter of the collar being greater than that of the transverse borehole of the pin mounted in the connection element. By means of the tensioning device, the braces/framework struts can be joined to each other, i.e. tensioned diagonally to each other, after insertion into the connection elements or into the rotatable pins, in such a way that the framework according to the invention is firmly joined in itself and all components involved are fixed. By means of the rotation capacity of the pins in the connection elements, the framework according to the invention is scalable, since when the bars and/or posts are lengthened, their angle changes along with the length of the framework diagonals. When tensioning by means of tension straps as braces, for example, the pins rotatably mounted in the connection elements are unnecessary, since the securing means for the braces are configured in the form of a bushing, an eyelet or a slot, for example.

In this way, a framework according to the invention can be held in shape or held together solely by means of tensioning devices by simple, preferably tool-less attachment of the bars provided with connection elements to the posts and insertion of (divisible) braces in bushings or framework struts in rotatable pins with transverse boreholes. As a result, minimal use of auxiliary resources is required to construct a framework according to the invention. According to the invention, the first bars are buoyant or function as floating bodies. In this way, they generate a buoyancy force that reduces, balances or even exceeds the force of their own weight in water. In a preferred embodiment, the buoyancy force of the first bar is so high that a framework can be kept floating on a water surface, whereby in other embodiments the buoyancy force of the first bar is lower and additional floating bodies can be positioned on the framework in extension of the posts, for example.

Preferably, therefore, the framework according to the invention can be constructed as a module, for example on land, and can be created to form a framework structure on land or offshore, or can be taken offshore to extend a load-bearing structure. In another embodiment, an offshore load-bearing structure module can be assembled on land or near the shore from several frameworks according to the invention and brought to its place of use, for example by means of a tugboat, where it can be connected to further offshore framework structure modules. See below for further details.

The buoyancy of a framework according to the invention can be ensured, as indicated above, by configuration of the first bars as hollow bodies which are sealed fluid-tight with the connection elements, or which are configured as fluid-tight hollow bodies which can be attached to the connection elements according to the invention. In the framework according to the invention, the first and second bars can exhibit different cross-sections or diameters, or be made of different materials, since the second bars do not have to contribute to the buoyancy force, even though this is conceivable. This is particularly true in applications where the frameworks according to the invention are aligned in perpendicular fashion in a support structure, with the first bars forming the lower bars, for example. In this case, the first bars floating on or just below the water surface are the key factors in generating a buoyancy force. It is therefore conceivable to make the diameter of a first bar much larger than the diameter of the other second bar in order to save weight, for example. For reasons of economy, however, it is also conceivable to design the two bars as identical parts, since the connection elements, four of which are installed in each framework, can then also be configured as identical parts without the need for adapter pieces. It may then be necessary to position additional floating bodies in the extension of the posts or on the bars in order to generate sufficiently high buoyancy forces. Also, the use of the same materials for the bars is not necessary according to the invention, so that, for example, the first bar generating a buoyancy force can be made of a plastic or plastic composite material, for example, whereas the other parallel (upper) second bar can be made of a metallic material and exhibit a cross-sectional shape of a double T-beam, for example, and be further made of seawater-resistant aluminium, for example.

In principle, it is possible to use any material that can customarily be used to generate a buoyancy force such as hollow bodies and materials with a density lower than that of water, especially salt water. Foamed materials can also be considered here, surrounding a solid core of the bar, for example, which is necessary for reasons of strength, for example.

In order to further increase the buoyancy force, in another embodiment according to the invention a floating body can be attached to the frameworks, for example in extension of the posts which space the two bars parallel to each other. However, fixing a floating body half way between the two connection elements is equally covered by the inventive concept, as is the positioning of two or more floating bodies, also one above the other on the framework, which is preferably buoyant itself according to the invention.

In order for the frameworks according to the invention to be able to be joined to each other obliquely or transversely to their surface extension or to be joined to form a three-dimensional structure, the connection elements exhibit an asymmetrical shape with respect to the longitudinal direction of the bars, whereby an extension is formed on one side and a holder is formed on the opposite side in such a way that the extension of a connection element of a first framework can be connected by means of the holder of another connection element of a further, second framework. This means that the connection elements at all corner points of the framework according to the invention can be configured as identical parts, because two adjacent connection elements of two frameworks can always be joined in the manner of a male-female connection.

One embodiment of the invention exhibits extensions on the connection elements into which a connecting eye is inserted, into which in turn a connecting pin can be replaced. In order to fix such a connecting pin, screw points for holders are provided on the side of the connection element opposite the connecting eye which can fix the respective connecting pins in the connecting eye of an adjacent connection element in the axial direction. According to the invention, therefore, it is possible to use identical parts for the connection elements both to hold together the framework according to the invention per se and also to join several frameworks according to the invention to each other via these connection elements. The exact configuration of the connecting eye, if necessary with reinforcing sockets, as well as the exact configuration of the connecting pins, which preferably exhibit conical ends, and the holding elements for receiving and locking the connecting pins are technically unlimited. A specific embodiment is described in more detail below with reference to the attached figures.

As indicated above, the frameworks according to the invention, which can be buoyant on their own, can be assembled to form a buoyant three-dimensional offshore framework structure, in particular a three-dimensional framework structure module according to the invention in the form of a straight triangular prism or a straight quadrangular or polygonal prism by means of suitable connection elements. A characteristic feature of such straight prisms is their congruent base and top surfaces. According to the invention, the frameworks described above form the side surfaces of such offshore framework structure modules according to the invention as basic modules.

According to the invention, the preference is for the frameworks in the offshore framework structure modules according to the invention to be oriented in perpendicular fashion, i.e. vertically to a water surface, with the first bars floating in or on the water. These framework structure modules, which in particular form modular base bodies for planar load-bearing structures, for example for the construction of a large-area framework structure, can be assembled both on land and at sea, since the frameworks are rigid and tensioned in themselves, making them easier to transport, assemble and manipulate than their individual parts. This also applies in particular when the frameworks are to be joined together in swell.

A framework structure formed from three frameworks according to the invention constitutes the smallest module, a straight triangular prism. The first bars span an approximately triangular base surface, while the second bars span a congruent triangular top surface. Since the three frameworks in this case are positioned in perpendicular fashion, the side edges of such a triangular prism are formed by two lateral rods of two adjacent frameworks. The frameworks are connected via the connection elements. Specifically—as explained above—for example via extensions formed on the connection elements with connecting eyes, in which connecting pins can be inserted, the pins being held by holders which can be screwed onto the adjacent connection element, for example. Due to the straight triangular prism structure, such a module is inherently stable and does not require any tensioning in the respective base or top surface, although this is conceivable.

If four frameworks according to the invention are joined to each other, each standing vertically, the result is a substantially cuboid structure, whereby the vertical side edges are formed from two lateral rods of adjacent frameworks in each case. Here, the first bars and the second bars each form a substantially rectangular base or top surface. Here, too, adjacent frameworks are joined to each other by means of the connection elements as described above.

In addition, the connecting pins of the individual connection elements can exhibit transverse boreholes into which connectors provided with tensioning devices can be inserted in order to clamp the frameworks together, for example at the base surface as well as at the top surface. If the transverse boreholes are designed as diagonal boreholes, connectors can also be joined in the space diagonal, i.e. from a connection point in the base surface to a connection point in the top surface which is not part of the same framework. Here again, the connecting pins are preferably mounted rotatably in the connection elements so that the three-dimensional offshore framework structure module constructed from preferably scalable frameworks is also scalable.

By joining frameworks according to the invention, straight triangular prisms or straight quadrangular prisms or straight polygonal prisms are created which can form an offshore framework structure module of an extensively planar load-bearing structure. These three-dimensional triangular, cuboid or polygonal structures can then be used to build individually designed load-bearing structures, depending on the application, which can be platforms or support facilities for renewable energies or maintenance platforms or also for wind turbines or drilling platforms. Of course, the frameworks according to the invention are also conceivable for use in support structures for leisure bathing platforms or as equipment platforms or break platforms for diving. The field of application of offshore load-bearing structures according to the invention is not limited to these possibilities, so floating bridges and the like are also conceivable. Should the inherent buoyancy of the offshore load-bearing structures formed from frameworks according to the invention not be sufficient for the respective application, floating bodies can additionally be attached to or below the first bars provided for buoyancy. For this purpose, it is conceivable, for example, to position corresponding mounting devices for retaining rods or retaining eyes for floating bodies in extension of the posts with which the framework structures can be supported at the respective connection points/nodes. In a preferred embodiment, four floating bodies can be positioned in this way at the respective four corners of the rectangular base surface on a cuboid framework structure, for example, although a larger number of floating bodies divisible by four is also within the realm of possibility.

Similarly, retaining rods can also be attached to the upper nodes or corner points of the framework structure modules in order to attach further structural elements for holding devices to them.

According to the invention, floating bodies are preferably used which exhibit a torus-like structure consisting of torus-segment-like pontoons. Such a torus-like floating body preferably exhibits a plurality of similar torus-segment-like pontoons. Each of these torus segments has connecting means on its substantially flat/planar side surfaces with which pontoons configured in the shape of a slice of cake can be connected to each other axially and/or radially in a positive fitting manner. A preferred type of connection according to the invention is the configuration of tongue and groove joints. The floating bodies preferably used according to the invention are thus assembled in a slice-of-cake-like manner, with receiving areas being formed at the torus centre, i.e. in the torus eye, in order to provide a connecting component, for example for joining to the connection elements of the nodes of the framework structures. Retaining means are provided on the outer circumference of the individual pontoons by which the individual segment-like pontoons are held together so that they are secured to prevent them from drifting apart. In a simple embodiment, these are belts that engage in circumferential grooves of the torus segments, thereby preventing the torus segments from drifting apart.

A torus—also according to the invention—is a body which is formed from a closed contour formed substantially from convex lines which rotates about a torus rotation axis which is spaced apart from it. In the simplest case, the contour made up of convex lines, for example, is a circle—which in this particular case results in a "doughnut" shape. However, any other contour also exhibiting concave areas can be used according to the invention, which rotates around the torus rotation axis at a distance from it to form a central torus eye. The directions given in the following such as axial, radial or circumferential therefore refer to the torus rotation axis, unless otherwise stated.

According to the invention, a pontoon forms a torus segment of such a torus, i.e. a complete torus-like floating body can be constructed with a plurality of these torus-segment-like pontoons. The number of torus-segment-like pontoons required to form a complete torus-like floating body is irrelevant to the inventive concept. Here, each pontoon is buoyant on its own and constitutes, for example, a closed hollow body.

For the assembly of a torus-like floating body, the buoyant torus-segment-like pontoons according to the invention have suitable connecting means on the substantially flat side surfaces for positive-fitting, axial, radial and/or oblique radial joining of adjacent pontoons. According to the invention, flat side surfaces are preferred here, as a good positive-fitting and force-fit connection of adjacent pontoons can be achieved in this way, especially in the axial torus rotation axis direction.

Furthermore, the invention provides retaining means on the radially outer pontoon surfaces to join adjacent pontoons in the circumferential direction of the torus and/or in the radial direction. With the positioning of connecting means on the side surfaces as well as retaining means on the radially outer pontoon surfaces according to the invention, the individual torussegment-like pontoons can be assembled to form a floating body according to the invention which exhibits a central torus eye. In this way, dismantling of a single torus-segment-like pontoon is enabled by means of the possibility of removal in the radial direction without having to dismantle the entire floating body. The retaining means attached to the radially outer pontoon surfaces in particular prevent the individual torus-segment-like pontoons from drifting apart radially. In a simple robust embodiment, these retaining means can be a ring, in particular a metal ring, or also a belt, e.g. an endless belt, which can be inserted/snapped into the retaining means around the pontoons.

Further according to the invention, a torus-segment-like pontoon according to the invention exhibits receiving areas on the radially inner pontoon surfaces in which a further component, for example a pontoon carrier, can be mounted in the torus eye. According to the invention, such a pontoon carrier is preferably partially positively fitted to each individual pontoon and therefore also to the overall floating body in planar fashion so that forces acting in the axial direction of the torus axis of rotation can be effectively transmitted. In particular, the pontoon carrier is connected to the torus eye in such a way that the forces acting on the floating body are not transmitted to the individual pontoons at specific points. Other fittings that may be required for the function of a wave power plant, such as a lifting rod, can be attached to such a pontoon carrier in the customary manner.

All in all, a torus-like floating body can thus be simply assembled from the torus-segment-like pontoons according to the invention which exhibits a compact shape and structure. The compact shape gives the torus-like floating body a high degree of stability and robustness. Furthermore, in the event of damage to a single torus-like segment, i.e. one pontoon, such a torus-like floating body can be repaired simply by replacing the damaged pontoon. In this case, complete replacement of the floating body is not necessary. This also allows easy maintenance on the water without having to dismantle a complete floating body of a framework structure module to be repaired on board of a ship or on land, for example.

According to the invention, the torus-segment-like pontoons according to the invention are produced from plastic by rotational melting, extrusion blow moulding or a RIM process, whereby all three processes allow the production of components with internal cavities. In the case of the RIM process, the production of solid floating bodies is also conceivable. This results in a cost-effective process for the production of a torus-segment-like pontoon according to the invention, which, with a relatively simple basic shape, makes it possible to produce a large number of pontoons in series in a cyclical process. The aforementioned manufacturing processes are industrially mature processes familiar to the person skilled in the art, which do not need to be explained in more detail in the context of this description of the invention. These processes guarantee a high degree of reproducibility, enabling a large number of pontoons according to the invention to be produced with low tolerance deviations. Since rotational melting, extrusion blow moulding and RIM processes are industrially mature, large-scale processes, they are also cost-effective in terms of cost relative to the individual production of single-section floating bodies, for example.

According to the invention, it is further preferable to manufacture the pontoons according to the invention from plastic, as is particularly implied by the use of the extrusion blow moulding and RIM processes. With rotational melting as well as with extrusion blow moulding, the pontoons according to the invention can be produced as hollow bodies, which improves their buoyancy. By means of rotational melting, pontoons according to the invention can also be made of aluminium, if necessary, but this requires a special aluminium alloy for use in seawater. Plastics, on the other hand, are more resistant to seawater—as is unfortunately shown by the environmental problem—and are thus preferred for use in torus-segment-like pontoons according to the invention. Another preferred feature of plastics is that their properties in terms of elasticity, elongation at break, notched impact strength, etc. can be better adapted to the respective application requirements than is possible with other materials such as wood, metals and textiles.

In preferred embodiments of the pontoon according to the invention, at least one groove extending substantially radially, axially or obliquely in the radial direction is positioned on a side surface as a connecting means to a side surface of an adjacent pontoon, said groove being able to engage in an opposite, substantially complementary tongue on the flat connecting surface of the adjacent pontoon in order to achieve a form fit between two adjacent pontoons. The result of this for a single pontoon is therefore that at least one groove extending obliquely in a radial or axial direction is formed on one side surface and that a substantially complementary tongue opposite to it is formed on the other side surface of the same pontoon. This necessity derives from the conceptual completion of the torus-like floating body so that all the individual pontoons can be joined to each other via a tongue and groove connection on the side surfaces.

It is obvious to a person skilled in the art that the tongue and groove pairings only need to be complementary in that the pontoons can be interlocked or pushed together. However, the radial length of a groove in particular can also be longer than the radial length of the tongue to be mounted in it. The only requirement is that the tongue must not be longer radially, otherwise it would not be possible to mount it. Therefore, complementary substantially refers to the geometric configuration of the groove and tongues in such a way that they can fit positively with each other at least in the axial torus direction.

It is irrelevant in terms of the composition, i.e. the structure of the floating body, whether the individual torus segments, i.e. the pontoons, can be pushed together in an axial or in a radial direction or in an oblique direction. It is known to a person skilled in the art that the individual tongue and groove joints may exhibit stops to facilitate completion of the torus, i.e. the floating body. Such stops can be implemented, for example, by means of a radially inward and/or radially outward limitation of the groove. Lugs or projections protruding from the side surfaces can also form such a stop, however. To the radially outer side, such a limitation is not necessary for the tongue and groove connection, but such a limitation acting radially outwards can facilitate the assembly or pre-assembly of the floating body if necessary.

In another preferred embodiment, the pontoon according to the invention is substantially symmetrical, with each side surface exhibiting at least one groove and one tongue. In this case, such a pontoon is symmetrical to the torus equatorial plane, whereby a groove positioned on the top of one side surface is positioned on the bottom of the other side surface. This applies analogously to the opposite, substantially complementarily configured tongues. Such a symmetrical configuration of the pontoon potentially facilitates assembly, as no attention has to be paid to the orientation of the pontoon when inserting or assembling the floating body.

The pontoon according to the invention also exhibits retaining means on the radially outer pontoon surfaces with which adjacent pontoons can be held together in the circumferential direction of the torus, i.e. in the circumferential direction of the floating body. At the same time, these retaining means can exert a force directed radially inwards in the direction of the torus eye or the torus rotation axis and therefore also fix the pontoons in the radial direction. In an exemplary embodiment, these retaining means are configured in the form of a circumferential groove on the radially outer torus surface, into which a ring, e.g. made of metal or a textile or elastomer, can be inserted/snapped. A person skilled in the art is familiar with many possibilities as to how such a fixation can be carried out in the circumferential direction, so all possibilities are encompassed by the inventive concept. Other examples are tensioning devices, such as tensioning brackets that engage in tensioning lugs; tensioning belts, such as those often used for transportation purposes; elastic and/or rubber-like rings; or also a rope, etc. When selecting the materials used for this purpose, however, it might be necessary to take into account the harsh environmental conditions on the high seas.

Further preferably, the pontoon according to the invention exhibits eyelets on the top and/or bottom for the purpose of transporting, storing and/or fastening the individual pontoon or the floating body constructed from a plurality of pontoons. These eyelets can also be positioned on the underside of the deployable floating body in order to attach securing means such as lashing belts or other—possibly also elastic—connecting means to these eyelets. In the case of a pontoon symmetrical to the torus equatorial plane, for example, eyelets provided for transport or for fastening belts or other connecting means may be located on both the top and bottom.

Further receiving areas can be provided on the inner pontoon surfaces, for example to mount a pontoon carrier in the torus eye, by means of which the floating body can be attached or fastened, for example, to a retaining rod or to a lifting rod of a wave power plant. By means of such a system, for example via a pontoon carrier mounted in the torus eye and a lifting rod attached thereto, oscillating movements of the floating body during the passage of a wave in particular can be transmitted to other devices of a wave power plant (cf. DE 10 2008 048 730 B4).

Both the retaining means on the outer pontoon surfaces and the receiving areas on the inner pontoon surfaces can extend from one side surface of the pontoon to the other side of the pontoon, for example as a groove or slot formed in the circumferential direction. After assembling a floating body according to the invention from a plurality of pontoons according to the invention, a belt can be inserted into such a groove on the outer pontoon surface in a circumferential manner around the floating body, said belt then being able to be tensioned in the circumferential direction by means of suitable tensioning or lashing devices, whereby the plurality of pontoons can be fixed in both the radial and circumferential directions. If at the same time a pontoon carrier is positioned in the torus eye of the floating body, this can also be fixed via the holding device on the outer circumference of the floating body, in particular if this pontoon carrier is mounted in slot-like receiving areas. In a further preferred embodiment, the radially inner receiving areas are configured in a slot-like manner so that a fastening element of the pontoon carrier—preferably having a plate or disc shape—can be inserted into the receiving areas and, in this way, planar force transmission is possible in the axial torus rotation axis direction between the pontoon carrier and the individual pontoons.

In a further preferred embodiment, the pontoon according to the invention exhibits a valve device for the purpose of at least partially flooding and emptying a cavity of the pontoon.

With the pontoons according to the invention, a torus-like floating body with a torus eye containing the torus axis of rotation can thus be constructed from a plurality of pontoons according to the invention in a simple manner, whereby the grooves and tongues on the side surfaces of adjacent pontoons interlock for the purpose of axial and/or radial fixation, whereby, for example, clamping means on the outer pontoon surfaces fix the pontoons to each other in the radial and circumferential directions. All in all, a compact floating body consisting of a plurality of pontoons according to the invention can be assembled in this way which is capable of withstanding a very high number of load changes in a solid and robust manner, in particular by means of positive-fitting connections supported by force-fit connections, even under adverse environmental conditions such as those that occur on the high seas.

In another embodiment, the pontoons of a floating body are of differing sizes with respect to the torus segment angle, i.e. the angle that spans the torus segment or the angle that the torus segment encloses. It is conceivable that the sum of the torus segment angles of the pontoons used is less than 360° and one or more remaining gaps are bridged with struts, for example. Such struts can serve as fastening elements for other components, such as measuring devices or similar. In this context, it is also conceivable that not only the opening angles of the torus segments differ from each other, but also that their axial height/length differ from each other. Such an embodiment could be deployed, for example, when stacked floating bodies are used, but the area exposed to transverse forces is to be reduced or broken up. All in all, the invention provides a floating body which is easy to assemble, transport and maintain, and which can be assembled, stored and transported in a cost-effective manner by manufacturing individual pontoons according to the invention. If, in addition, a ring or belt is used circumferentially as a retaining device, this also provides an inexpensive, simple and robust means of holding the plurality of pontoons according to the invention together as a compact floating body.

As indicated above, a substantially rotationally symmetrical pontoon carrier is positioned in the torus eye, the axis of rotation of which is aligned with the torus axis of rotation. The pontoon carrier preferably exhibits a disc-shaped support element that interacts with the receiving areas on the inner pontoon surfaces. Furthermore, the pontoon carrier preferably exhibits a substantially rotationally symmetrical support ring concentric to the torus axis, against which the pontoons can be supported against the loads and moments acting on them.

For additional support of the pontoons according to the invention on the pontoon carrier, the latter may exhibit additional substantially radially aligned attachment webs which come into contact with the side surfaces of the individual pontoons when the floating body according to the invention is assembled. Such attachment webs are preferably positioned on the side of the support element opposite the support ring.

With the interaction between the support element, the support ring and the attachment webs, together with the pontoons positioned on them, a compact floating body is provided which exhibits a closed distribution of forces and is sufficiently stable to be able to withstand adverse conditions at sea, even when forces are acting outside the axis of rotation of the torus.

Preferably, the pontoon carrier further exhibits an additional fastening element positioned substantially parallel to its axis of rotation and therefore also parallel to the torus axis, to which a retaining means aligned parallel to the torus axis in the torus eye can be fastened for the floating body, by means of which it can in turn be tensioned, for example on a framework according to the invention, an offshore framework structure according to the invention or a platform of a buoyant island.

The framework structure according to the invention can also be used to configure a wave power plant, as indicated above, by forming a planar support structure composed of a plurality of framework structures. At the respective side edges of the offshore framework structure modules, the previously described torus-like floating bodies can then be movably mounted in such a way that they are able to follow the passage of the waves through the support structure/wave power plant in a vertical direction. This means that the individual floating bodies move vertically up and down in an oscillating motion, depending on whether they are currently on a wave crest or in a wave trough. A lifting rod is attached to these torus-like floating bodies, preferably in the torus eye, which transmits this oscillating vertical movement to linear generators. These are set in rotation by the oscillating movements and can generate electrical energy according to the principle of a dynamo, which is accumulated, rectified and transmitted to land via suitable means.

In a simplified embodiment shown of a framework structure in the form of a straight triangular prism, for example, three movably positioned floating bodies can perform such an up and down movement in this way. Scaled up in a modular manner, it is therefore readily comprehensible that a structure which is planar in configuration comprising a hundred or more such triangular framework structure modules can provide a plurality of movable floating bodies for energy conversion, thereby forming a wave power plant.

If one imagines a cuboid surface structure with an edge length of one hundred metres or more, which is made up of frameworks according to the invention with a bar length of, for example, 10 m—for example 10×10 cuboid framework structure modules—it can be readily comprehended that such an offshore support structure in planar configuration floats relatively stably on a certain surface even when a wave passes through such an extended support structure. It is also conceivable that the weight of the extensively planar support structure is balanced in such a way that, on the one hand, it has a high inertia against deflection by the waves and, on the other hand, it provides sufficient inherent buoyancy so that the movably positioned floating bodies are deflected purely by the force of the waves and do not have to exert any buoyancy force to hold the support structure.

Figure 2:
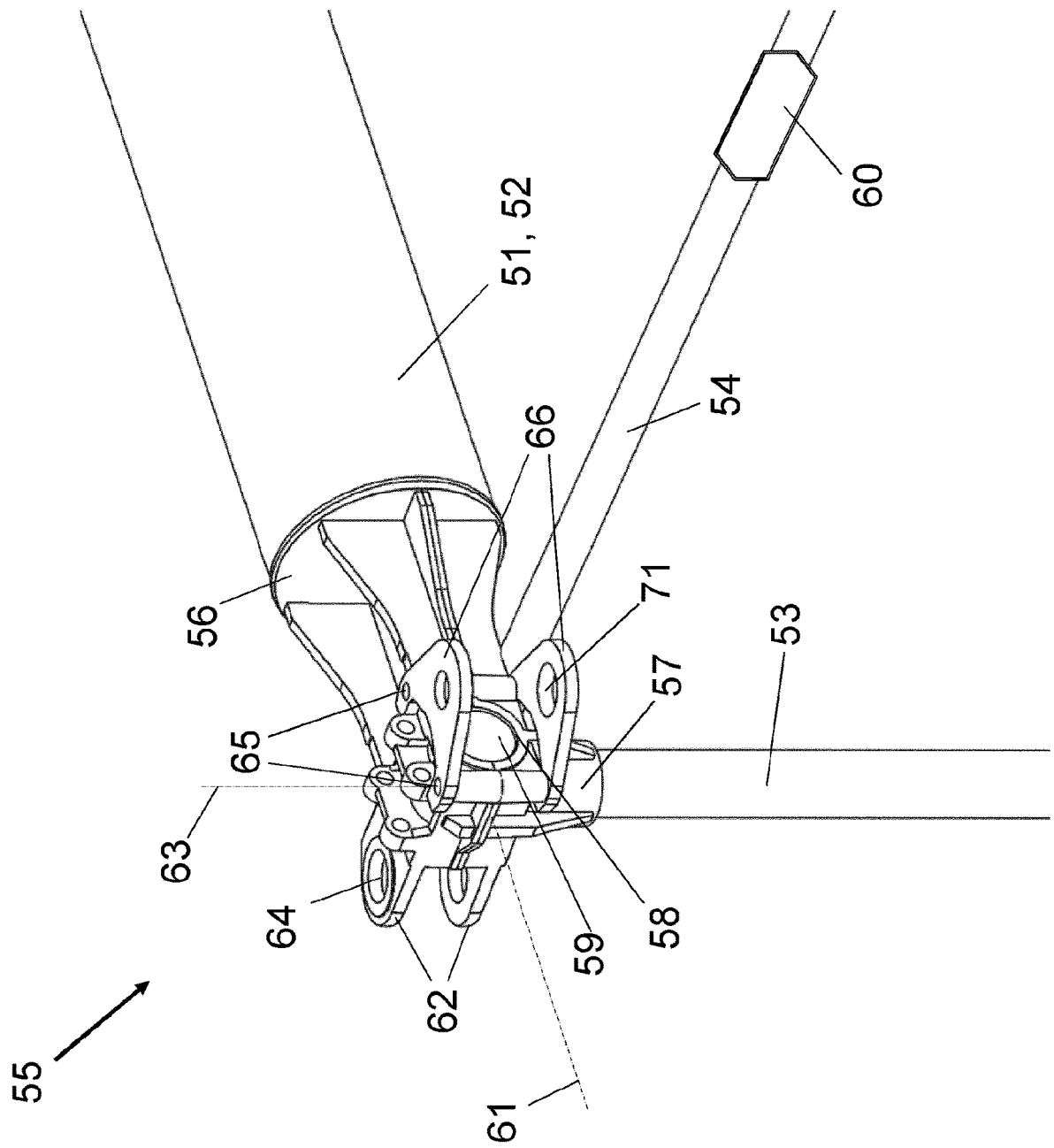
Figure 3:
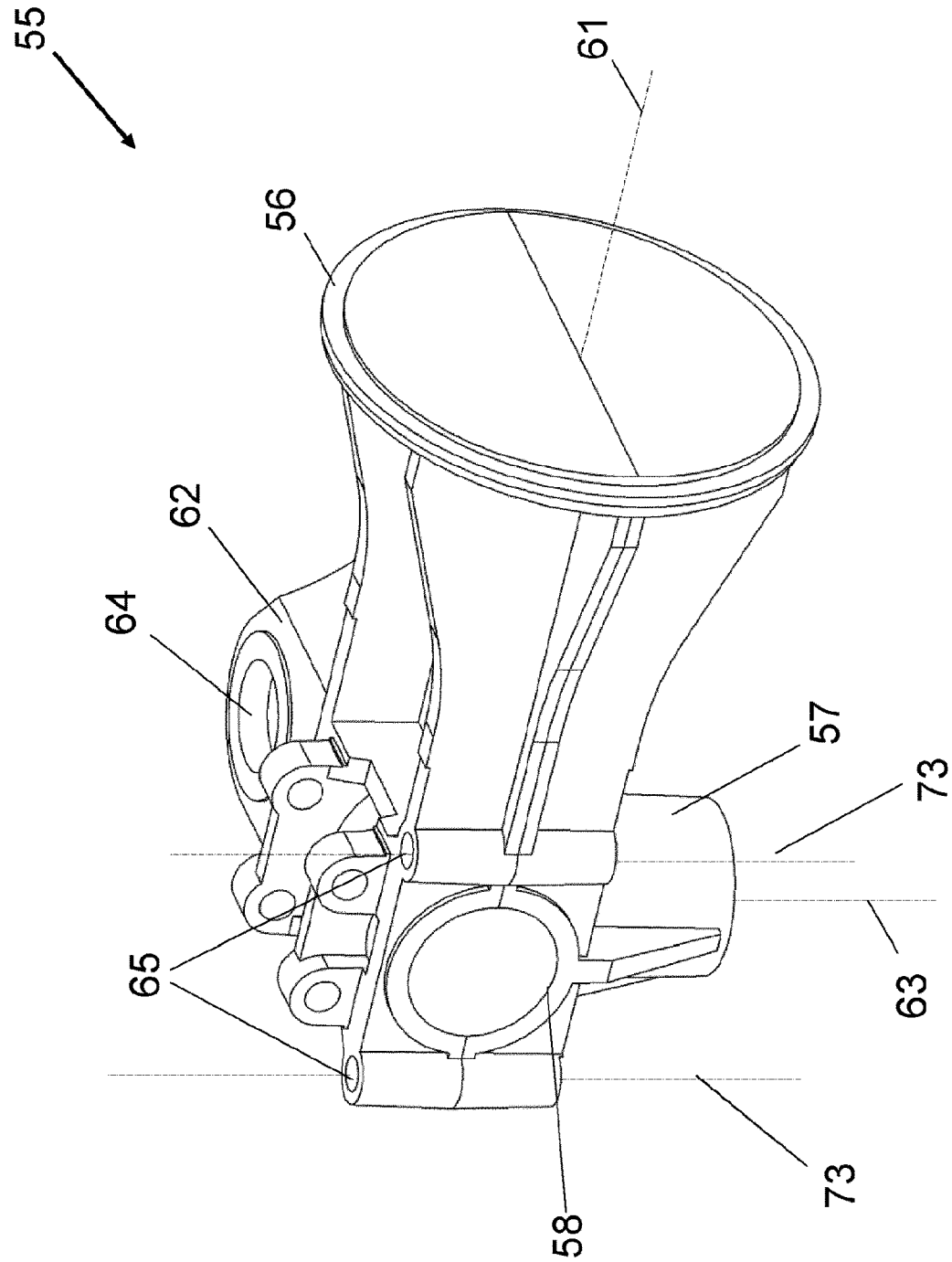
Figure 4:
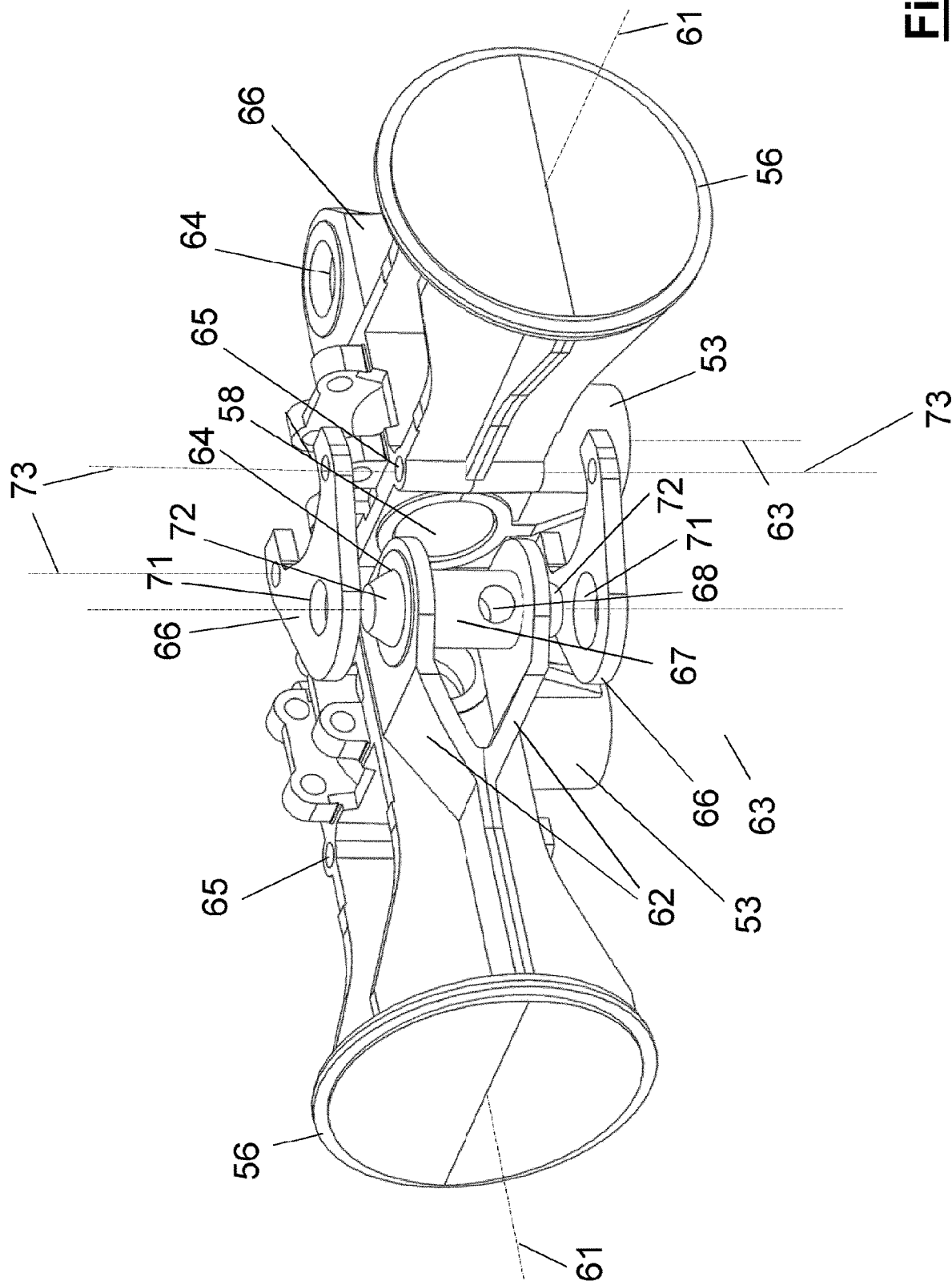
Figure 5:
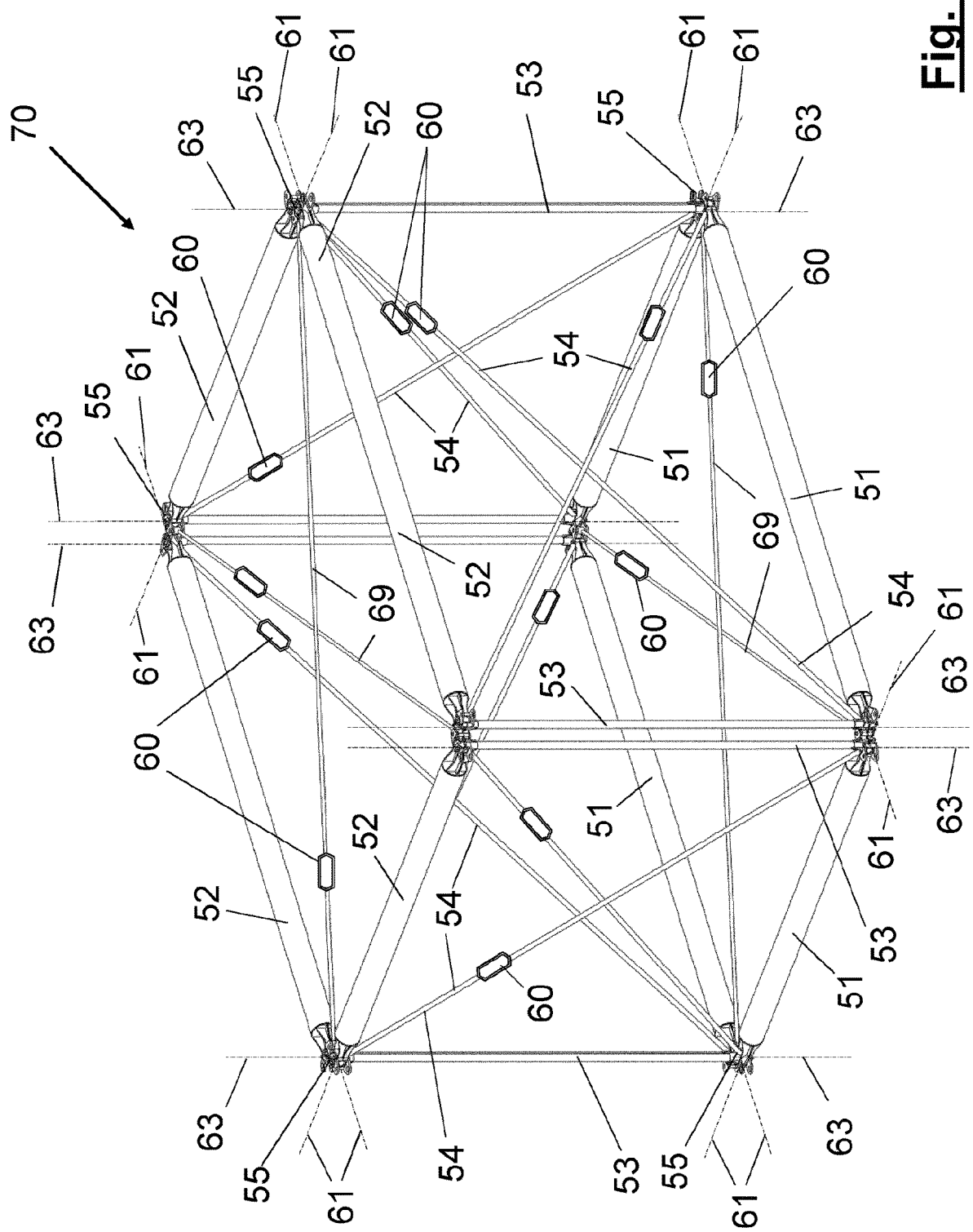
Figure 6:
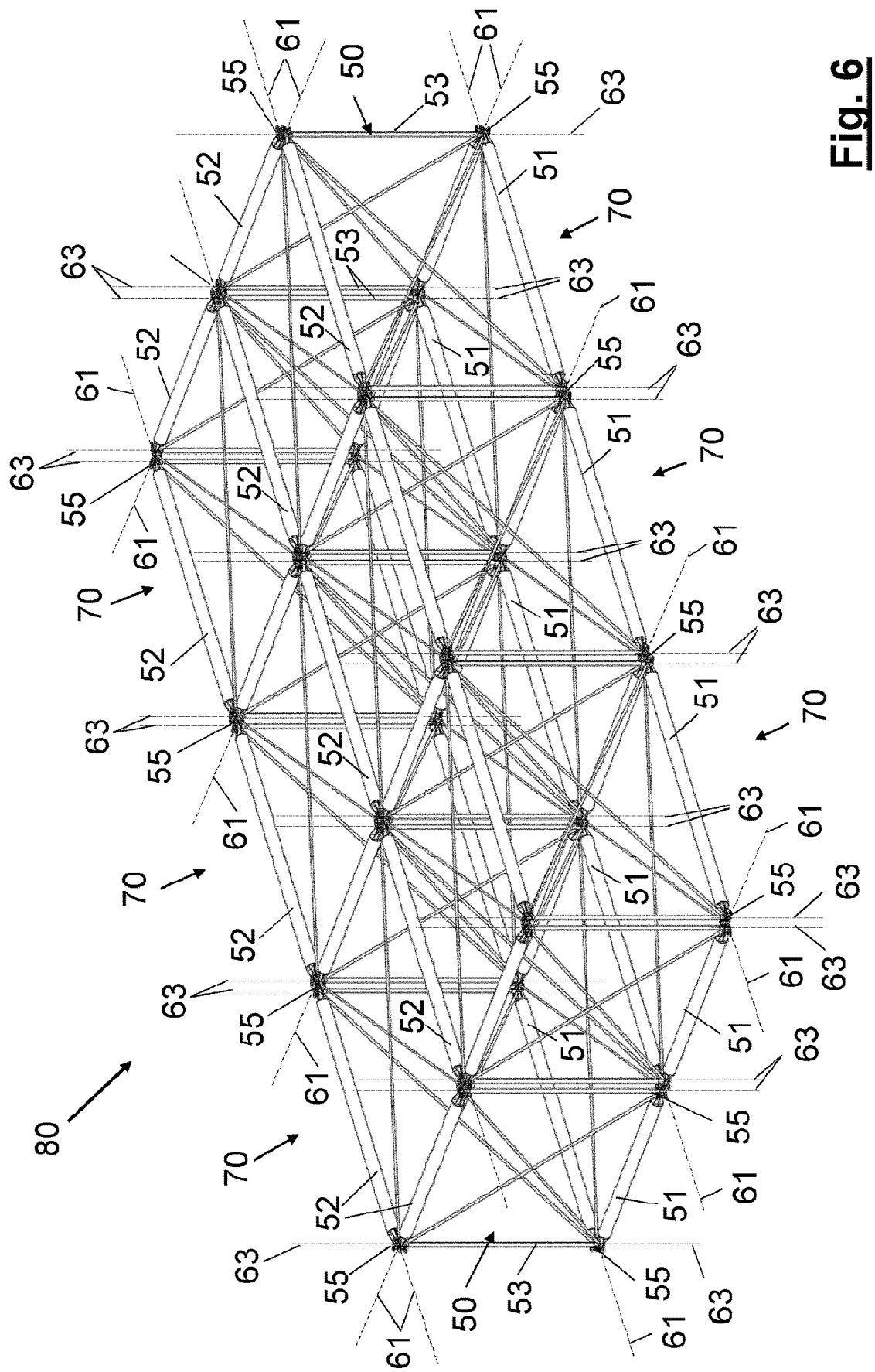
Figure 7:
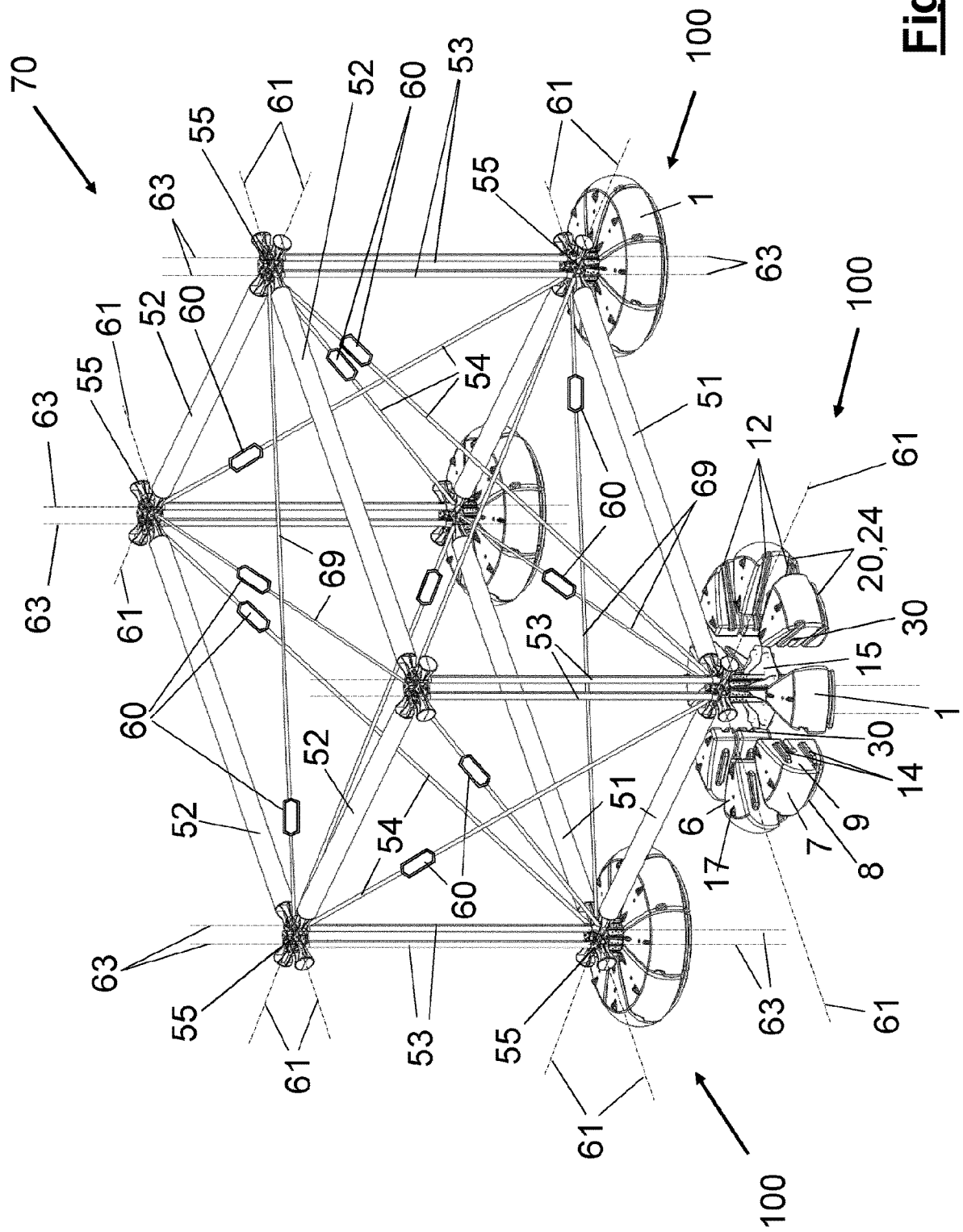
Figure 8:
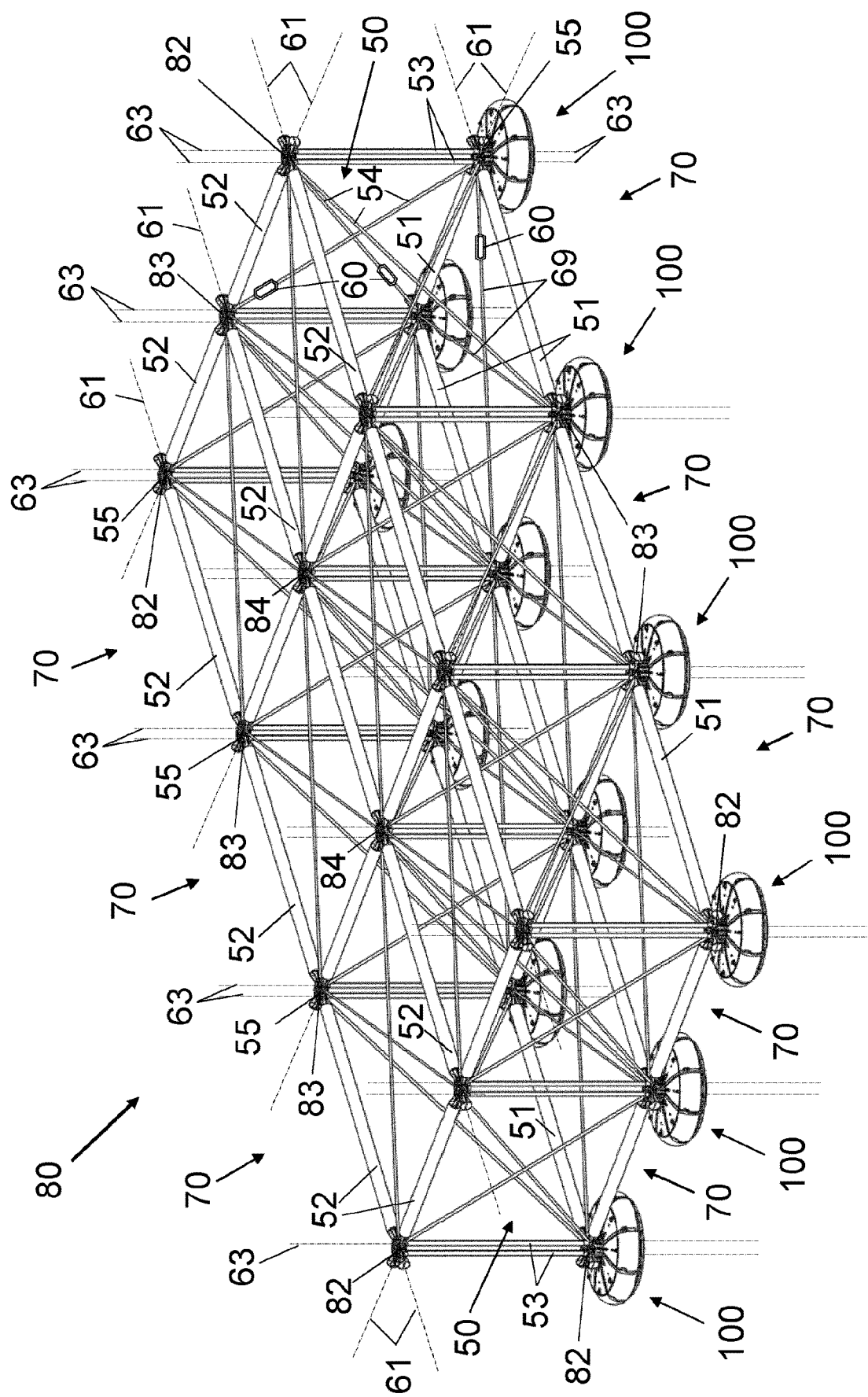

The present invention of the framework according to the invention as well as the modular framework structures according to the invention and their assembly into support structures extended in planar fashion are illustrated below in figures based on preferred embodiments, whereby the figures or the embodiments shown therein do not restrict the inventive concept. The following are shown:

FIG. 1: A framework according to the invention;

FIG. 2: A perspective view of a connection element for the construction of a framework according to the invention;

FIG. 3: A connection point of a framework according to the invention;

FIG. 4: An embodiment for joining two connection elements of adjacent frameworks;

FIG. 5: A perspective view of a framework structure module according to the invention;

FIG. 6: A perspective view of a support structure consisting of a plurality of framework structure modules;

FIG. 7: A perspective view of a modular support structure according to the invention;

FIG. 8: The framework structure according to FIG. 6 in a further embodiment according to the invention;

FIG. 9: A module for a wave power plant;

FIG. 10: Cross-section of a floating body according to the invention

Figure 11:
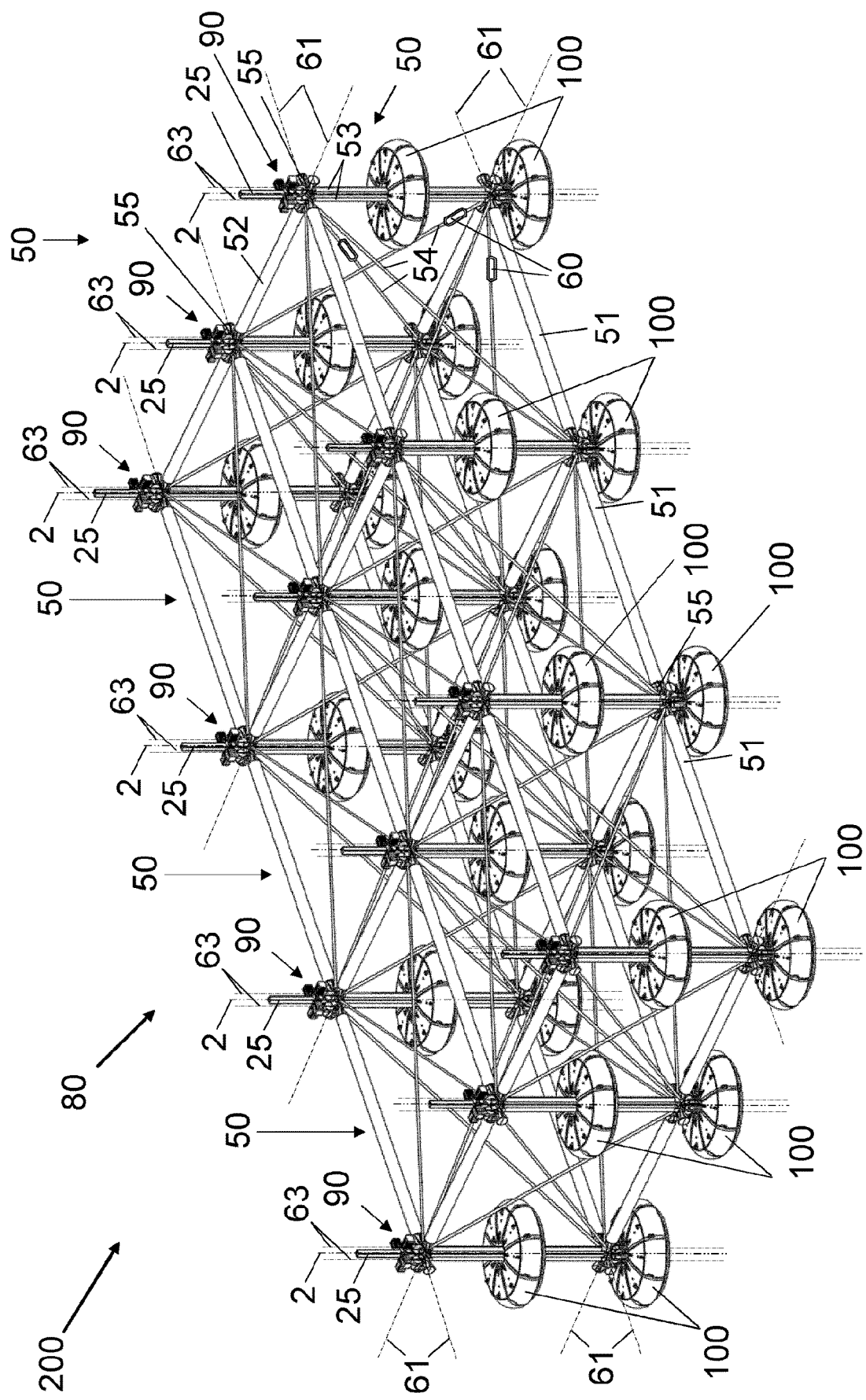

FIG. 11: A wave power plant composed of a plurality of framework structure modules.

FIG. 1 shows a buoyant framework 50 according to the invention with a first bar 51 and in parallel a second bar 52 with their respective longitudinal axes 61. The two bars 51 and 52 are held in place by posts 53, which are mounted in connection elements 55. The longitudinal directions 63 of the posts 53 are perpendicular to the longitudinal direction 61 of the bars 51 and 52. Connection elements 55 are positioned at each end of the first bar 51 and the second bar 52, which are tensioned together by means of braces 54 which exhibit tensioning devices 60. This creates a stable framework 50, which is diagonally tensioned by means of the braces 54. The braces 54 are hooked into the connection elements 55, for example in such a way that they are locked in the direction of the centre of the framework. In a further preferred embodiment, the braces 54 are mounted in rotatable pins 59 (see FIG. 2) with transverse boreholes 68 in such a way that they are connected to the tensioning devices 60 and can tension the framework 50 diagonally.

The framework 50 shown in FIG. 1 exhibits approximately the same diameters for the two bars 51, 52, but this is not mandatory, as described above. The lateral posts 53 and the brace 54 can be, for example, tubes or solid bars made of a metallic material. However, if the framework 50 is intended for offshore use in the sea, a salt-water-resistant alloy should be chosen when selecting the material. This of course applies to the connection elements 55, too.

FIG. 2 shows a detailed view of a connection point/node of the framework 50 according to the invention; here it can be seen that the posts 53 are mounted in receiving areas 57 of the connection elements 55 and the bars 51 and 52 are joined to the connection element 55 via flanges 56. Furthermore, a pin 59 can be seen which is inserted into a borehole 58 of the connection element 55 and which holds a framework strut 54 in the form of a brace. On one side of the connection element 55, projections 62 are shown with a connecting eye 64 formed in it, into which, for example, a connecting pin 67 (cf. FIG. 4) can be inserted. The connecting pin is lockable by means of holders 66, which can be attached to the connection element 55 at screw points 65 on the opposite side of the extensions 62.

FIG. 3 shows a connection element as it is used, for example, four times per framework when assembling a single framework according to the invention. On the right-hand side, the flange 56 is shown for the possible fluid-tight attaching of the connection element 55 to one end of a bar 51 or 52, as well as the receiving area 57 for attaching a post 53. Above the receiving area 57, a borehole 58 is shown in which the pin 59 for holding the braces 54 can be inserted. Above the borehole 58, two screw points 65 are shown, to which holders 66 can be screwed for fixing a connecting pin. Here, the axes 73 of the screw points 65 can serve to guide the holders 66, so that, for example, a connecting pin 67 mounted in the connecting eye of an adjacent connection element of another framework can be received, centred and finally fixed. On the opposite side, there is an upper extension 62 with a corresponding connecting eye 64 for inserting a connecting pin 67 (not shown here; cf. FIG. 4).

FIG. 4 shows two connection elements 55 and an embodiment of how the two connection elements 55 are joined. Such a connection situation arises, for example, when two frameworks 50 according to the invention are to be joined to each other in order to build a framework structure 70 or an offshore framework structure module 70. In FIG. 4, holders 66 are used which exhibit an approximately triangular shape and can receive and lock a connecting pin 67, which exhibits tapered ends 72, via a funnel-shaped opening 71. To this end, the holders can be gradually brought together via screw pins guided along the axes 73 of the screw points 65, for example, so that when two frameworks 50 according to the invention are assembled, the two holders 66 are pre-fixed, for example at a distance greater than the axial length of the connecting pin 67. The connecting pin 67 inserted in the connecting eye is received between the two holders 66 when the holders are brought closer together with their funnel-shaped openings facing each other. When the two holders 66 approach each other, the connecting pin 67 is received in the funnel-shaped receiving areas 71 of the holders 66 and is thereby centred and finally fixed.

FIG. 4 also shows a transverse borehole 68 in the connecting pin 67, into which a connector 69 can be inserted for tensioning a framework module 70. In FIG. 4, this transverse borehole 68 is aligned in the plane spanned by the longitudinal directions 61 of the bars, which, as explained above, can also be at an angle to it if tensioning is to be implemented in the direction of the space diagonal of a framework module 70.

FIG. 5 shows a framework structure module 70, also known as a framework module 70, which is constructed from four frameworks 50 according to the invention. In this case, the first bars 51 each form a substantially rectangular base area. The top surface, which is substantially rectangularly spanned by the second bars 52, is supported by two posts 53 on each of the respective side edges, spaced parallel to each other. The frameworks 50 according to the invention are tensioned via braces 54, which are supported on the "outer surfaces" of the respective framework 50. The individual frameworks 50 are held together by connection elements 55, as shown for example in FIG. 4, and tensioned by connectors 69 which run diagonally in the base or top surface. The individual connectors 69 and the braces 54 each have tensioning devices 60, for example for joining and tensioning the connectors 69 and the braces 54.

FIG. 6 shows a support structure 80 constructed in a planar manner which is made up of several framework structure modules 70, with the framework 50 according to the invention forming the basic module. The person skilled in the art will recognise that in the embodiment of FIG. 6, 17 individual frameworks according to the invention are joined to each other, whereby diagonal struts 69 are positioned for further tensioning of the support structure 80 in each of the six top surfaces and six base surfaces which are formed.

FIG. 7 shows an example of a framework module 70 on which floating bodies 100 are positioned on the first bars 51 or in extension of the posts 53. These floating bodies 100 which are positioned at the respective connection points of the first bars 51 of adjacent frameworks 50 consist of individual torus-segment-like pontoons 1, each of which is buoyant itself. These torus-segment-like pontoons 1 are plugged together by connecting means positioned on their side surfaces and held together by retaining means 30 on the circumferential surfaces. In the simplest case, these retaining means 30 consist of a tensioning belt 24 which is tightened around the torus-segment-like pontoons. This type of construction of the floating bodies 100 is preferred, firstly in order to reduce the transport volume of the floating bodies and secondly in order to ensure a lower probability of default of the floating bodies. Should one of the torussegment-like pontoons 1 leak during operation, it can be replaced individually; it is not necessary to replace the floating body 100 in its entirety. Another advantage of this segment-like construction is that the weight of the individual segments is much less than the total weight of the floating bodies 100.

FIG. 8 shows a support structure 80 which is made up of six modules according to FIG. 7. Here it can also be seen that each module 70 is formed from four frameworks 50 according to the invention, with adjacent modules exhibiting a common framework 50. The double posts 53 on the outer side edges of the support/load-bearing structure 80 are characteristic of this. The two inner nodes exhibit four vertical posts 53 accordingly. The connections forming T-nodes on the side surfaces accordingly have three vertical posts 53.

FIG. 9 shows a cuboid framework structure module 70 which forms part of a wave power plant. In this exemplary module shown, floating bodies 100 are positioned between the first bars 51 and the second bars 52 of the respective frameworks 50 according to the invention. The floating bodies 100 can thereby oscillate along the posts 53 and move lifting rods 25 in linear fashion up and down along the torus rotation axis 2. These lifting rods 25 are joined to linear generators 90 in such a way that the linear lifting movement of the lifting rods 25 is converted into rotational movements of the linear generators 90 so that wave energy can be converted into electrical energy according to the dynamo principle. A cross-section of the floating bodies 100 used according to the invention is shown in FIG. 10, which depicts a section along plane A-A of FIG. 9.

FIG. 10 shows two pontoons 1 positioned symmetrically to the torus rotation axis 2. Here, on the pontoon 1 shown on the right-hand side in FIG. 10, tongues 14 can be seen on the pontoon side surface 9 configured to be substantially flat, said tongues being able to engage in grooves 12 which can be seen on the side surface 9 of the pontoon 1 shown on the left-hand side in FIG. 10. It can be seen from this that each pontoon 1 exhibits tongues 14 on one of its side surfaces 9 and grooves 12 on the other side surface 9, each of which forms a tongue and groove connection with an adjacent pontoon 1 when a floating body 100 is assembled—cf. also the left-hand front floating body 100 in FIG. 9. By means of such a tongue and groove connection, the pontoons 1 are fixed in the axial direction of the torus rotation axis 2. Via clamping means 24 which are inserted into a circumferential groove 20, the pontoons are secured against drifting apart in a radial direction against a pontoon carrier 15. A lifting rod 25 is attached to the pontoon carrier 15 in the direction of the torus rotation axis 2 which can be moved in a vertical direction when the floating body is deflected, for example by a wave. Parallel to the lifting rod 25, the posts 53 of the framework structure module according to the invention can be seen, along which the pontoon carrier 15 of the floating body 100 can slide or through which the pontoon carrier 15 is guided vertically. The pontoon carrier 15 is mounted in a positive-fitting manner via receiving areas 30 on the radially inner sides of the pontoons 1 by means of a support element 32 in the form of a plate 33. Preferably, the support element 32 exhibits attachment webs/bars 35 on its top or bottom which are radially aligned and provide additional circumferential support for the individual pontoons 1 so that circumferential forces acting on the floating body 100 can be transmitted from the pontoon carrier 15 to the posts 53, thereby keeping the lifting rod 25 largely free of rotational forces.

Of course, further floating bodies 100 can be positioned at the lower ends of the offshore framework structure module 70 below the first bars 51, as shown for example in FIG. 11. FIG. 11 shows a wave power plant 200 constructed from six framework structure modules 70 according to FIG. 9. Here, the frameworks 50 of the framework structure module 70, which is buoyant in itself according to the invention, are provided with additional floating bodies 100 at the individual nodes in order to give the wave power plant greater buoyancy.

The floating bodies 100 positioned between the first bars 51 and the second bars 52 can move in an oscillating manner along the side bars 53 following the passage of a wave. This raises and lowers the lifting rods 25 and drives the linear generators 90 to convert wave energy into electrical energy. It is readily comprehensible for a person skilled in the art that such a wave power plant 200 can also be designed in much larger dimensions with multiple movable floating bodies 100, whereby the self-stabilization of the framework structure or support structure 80 increases with the increase in the planar expansion of the wave power plant 200.

All in all, the buoyant framework 50 according to the invention can provide a variety of possible support structures for a range of different offshore applications, of which the application shown for a wave power plant 200 is only one example among many. For the purpose of the invention, all of the support structures 80 according to the invention can be expanded in a modular manner with the basic module of the framework 50 according to the invention and be enlarged in this way. Furthermore, the modular design of the frameworks 50 and the support structure modules 70 and the modular design of the floating bodies 100 allows for easy assembly as well as reduced maintenance, since damaged elements easily be replaced in a modular manner.

| | List of reference numerals |
|---|---|
| 1 | Pontoon |
| 2 | Torus rotation axis |
| 3 | Torus equatorial plane |
| 4 | Torus eye |
| 5 | Inner pontoon surface |
| 6 | Pontoon top |
| 7 | Outer pontoon surface |
| 8 | Pontoon bottom |
| 9 | Side surface |
| 10 | Connecting means |
| 12 | Groove |
| 14 | Tongue |
| 15 | Pontoon carrier |
| 17 | Eyelets |
| 20 | Retaining means/Circumferential groove |
| 22 | Tensioning device |
| 24 | Tensioning Belt/ring |
| 25 | Holding element/lifting rod |
| 30 | Receiving means |
| 32 | Support element |
| 33 | Plate |
| 35 | Attachment webs/bars |
| 37 | Support ring |
| 40 | Valve device |
| 45 | Valve actuator |
| 50 | Framework |
| 51 | First bar |
| 52 | Second bar |
| 53 | Post |
| 54 | Brace |
| 55 | Connection element |
| 56 | Flange |
| 57 | Receiving areas |
| 58 | Borehole |
| 59 | Pin |
| 60 | Tensioning device |
| 61 | Longitudinal direction of bars |
| 62 | Projections/Extensions |
| 63 | Longitudinal direction of posts |
| 64 | Connection eye |
| 65 | Screw point |

| | List of reference numerals |
|---|---|
| 66 | Holder |
| 67 | Connecting pin |
| 68 | Transverse borehole |
| 69 | Diagonal struts |
| 70 | Framework structure module |
| 71 | Funnel-shaped opening |
| 72 | Tapered end |
| 73 | Axis - screw points |
| 80 | Support structure |
| 82 | Corner node |
| 83 | T-node |
| 84 | Inner node |
| 90 | Linear generator |
| 100 | Floating body |
| 200 | Wave power plant |

The invention claimed is:

1. A floatable, toroidal-segment pontoon configured for building a toroidal floating body constructed from a plurality of the toroidal-segment pontoons, the toroidal floating body having a torus eye containing a torus axis of rotation, wherein each of the plurality of toroidal-segment pontoons comprises:
connecting means on two substantially flat side surfaces of each of the plurality of toroidal-segment pontoons, wherein the connecting means are designed in such a way that adjacent pontoons of the plurality of toroidal-segment pontoons can be joined in a positive-fitting manner in an axial direction, with the connecting means configured on a first side surface as at least one groove extending substantially radially, axially or obliquely in a radial direction, and on a second side surface opposite the first side surface the connecting means is configured as at least one substantially complementary tongue opposite the at least one groove;
receiving areas on at least one radially inner pontoon surface for receiving a component in the torus eye; and
retaining means arranged on at least one radially outer pontoon surface for holding adjacent pontoons of the plurality of toroidal-segment pontoons together in a torus circumferential direction and in the radial direction;
wherein at least one of the retaining means and the receiving areas is configured in a form of a groove or a slot extending circumferentially from the first side surface to the second side surface on the at least one radially outer pontoon surface or on the at least one radially inner pontoon surface, respectively; and
wherein each of the plurality of toroidal-segment pontoons is made of plastic.

2. The floatable, toroidal-segment pontoon according to claim 1, further comprising a plurality of eyelets on at least one of a top surface and a bottom surface of each of the plurality of toroidal-segment pontoons for transporting at least one of the plurality of toroidal-segment pontoons and the toroidal floating body.

3. The floatable, toroidal-segment pontoon according to claim 1, wherein each of the plurality of toroidal-segment pontoons is substantially symmetrical to a torus equatorial plane with each of the first and second side surfaces exhibiting the at least one groove and the at least one tongue.

4. The floatable, toroidal-segment pontoon according to claim 1, further comprising a valve device for at least partially flooding and emptying a cavity of each of the plurality of toroidal-segment pontoons.

5. The toroidal floating body with a torus eye containing the torus axis of rotation, which is constructed from the plurality of the toroidal-segment pontoons according to claim 1, wherein the at least one groove and at least one tongue on the first and second side surfaces of adjacent pontoons of the plurality of toroidal-segment pontoons interlock for at least one of axial fixation and radial fixation and the retaining means on the at least one radially outer pontoon surface fix each of the plurality of toroidal-segment pontoons in the radial direction and in the circumferential direction.

6. The toroidal floating body according to claim 5, wherein the retaining means is a circumferential ring or belt or tensioning device which holds the plurality of toroidal-segment pontoons together in the circumferential direction.

7. The toroidal floating body according to claim 5, further comprising a substantially rotationally symmetrical pontoon carrier mounted in the torus eye by means of the receiving areas, an axis of rotation of said substantially rotationally symmetrical pontoon carrier corresponding to the torus axis of rotation, and a lifting rod aligned substantially parallel to the torus axis of rotation configured for attachment to the substantially rotationally symmetrical pontoon carrier.

8. The toroidal floating body according to claim 7, wherein the substantially rotationally symmetrical pontoon carrier comprises a support element that interacts with the receiving areas on the at least one radially inner pontoon surface on which a substantially rotationally symmetrical support ring is arranged, against which the plurality of toroidal-segment pontoons can be supported.

9. The toroidal floating body according to claim 8, wherein the substantially rotationally symmetrical pontoon carrier comprises substantially radially aligned attachment webs which come into contact with the first and second side surfaces of the plurality of toroidal-segment pontoons.

10. The toroidal floating body according to claim 5, wherein angles defining a size of each of the plurality of toroidal-segment pontoons from which the toroidal floating body is constructed differ from each other and wherein an axial length of each of the plurality of toroidal-segment pontoons from which the toroidal floating body is constructed differ from each other.

11. The toroidal floating body according to claim 5, further comprising a valve actuator which can be used to actuate at least one valve device of each of the plurality of toroidal-segment pontoons for at least partially flooding or draining each of the plurality of toroidal-segment pontoons.

12. The toroidal floating body according to claim 5, wherein angles defining a size of each of the plurality of toroidal-segment pontoons from which the toroidal floating body is constructed differ from each other or wherein an axial length of each of the plurality of toroidal-segment pontoons from which the toroidal floating body is constructed differ from each other.

* * * * *